United States Patent [19]

Gray et al.

[11] Patent Number: 5,470,480
[45] Date of Patent: Nov. 28, 1995

[54] PROCESS FOR TREATING WASTE WATER EFFLUENT

[75] Inventors: John M. Gray, Roswell; David C. Lovetro, Marietta, both of Ga.

[73] Assignee: EKA Nobel, Inc., Marietta, Ga.

[21] Appl. No.: 261,707

[22] Filed: Jun. 17, 1994

Related U.S. Application Data

[63] Continuation-in-part of Ser. No. 239,568, May 9, 1994, abandoned.

[51] Int. Cl.$^6$ .................................................. C02F 1/48
[52] U.S. Cl. .................. 210/632; 210/748; 210/759; 210/763; 210/928
[58] Field of Search .................. 210/748, 759, 210/763, 765, 908, 917, 928, 632

[56] References Cited

U.S. PATENT DOCUMENTS

| | | | |
|---|---|---|---|
| 3,833,464 | 9/1974 | Rolfe | 162/29 |
| 3,945,917 | 3/1976 | Foster | 210/917 |
| 3,990,969 | 11/1976 | Broddevall | 210/917 |
| 4,012,321 | 3/1977 | Koubek . | |
| 4,541,944 | 9/1985 | Sanderson . | |
| 4,792,407 | 12/1988 | Zeff et al. | 210/748 |
| 4,851,128 | 7/1989 | Rose | 210/917 |
| 5,043,080 | 8/1991 | Cater et al. | 210/748 |
| 5,174,904 | 12/1992 | Smith, II | 210/748 |
| 5,178,762 | 1/1993 | Pokora et al. | 210/759 |
| 5,190,609 | 3/1993 | Lin et al. . | |
| 5,200,089 | 4/1993 | Siefert et al. | 210/725 |
| 5,205,940 | 4/1993 | Graetzel | 210/748 |
| 5,236,602 | 8/1993 | Jackson . | |
| 5,238,581 | 8/1993 | Frame et al. . | |
| 5,248,395 | 9/1993 | Rastelli et al. . | |
| 5,258,124 | 11/1993 | Bolton et al. | 210/748 |
| 5,266,214 | 11/1993 | Safarzedeh-Amiri | 210/748 |
| 5,275,741 | 1/1994 | Miano et al. | 210/748 |
| 5,302,288 | 4/1994 | Meidl et al. | 210/759 |
| 5,330,661 | 7/1994 | Okuda et al. | 210/748 |

FOREIGN PATENT DOCUMENTS

| | | |
|---|---|---|
| 3501528 | of 1986 | Germany . |
| 52-35445 | of 1977 | Japan . |
| 60-28883 | of 1985 | Japan . |
| 62-176595 | of 1987 | Japan . |

OTHER PUBLICATIONS

K. Tittle et al, "The Oxidative Pre-treatment of Organic Matter in Natural Waters", Ion Exchange Technology, 1984, pp. 74–84.

Morayama et al, "Photoinduced Oxidation of Humic Acid in Water Using Hydrogen Peroxide and UV Irradiation", Water Pollution Department of National Research Institute for Pollution and Resources, Japan, Kogai, 1985 20(i), pp. 9–15.

*Primary Examiner*—Neil McCarthy
*Attorney, Agent, or Firm*—Leydig, Voit & Mayer

[57] ABSTRACT

Waste water effluent streams are treated with hydrogen peroxide and ultraviolet radiation. Hydroxyl ions formed by action of UV on $H_2O_2$ reduces BOD, COD, AOX and color in effluent. In the case of pulp mill effluent, some or all of the effluent can then be recycled to the pulp mill.

22 Claims, 2 Drawing Sheets

PROCESS FOR TREATING WASTE WATER EFFLUENT

CROSS-REFERENCE TO RELATED APPLICATION

This application is a continuation-in-part of U.S. patent application Ser. No. 08/239,568, filed May 9, 1994, abandoned.

BACKGROUND OF THE INVENTION

The present invention relates to a process for substantially reducing the level of organic and chlorinated organic contaminants, including color contaminants, in waste water effluent streams, by subjecting the effluent streams to a combination of ultraviolet light and hydrogen peroxide, optionally in the presence of catalysts. The invention is particularly adapted to treatment of effluent from a pulp mill but is also suitable in other applications, such as sewage treatment and in eliminating contaminants from ground water. The invention reduces the contaminant load to conventional waste water treatment facilities and, in the case of pulp mills, permits an increase in mill capacity without costly additional investment for expanding waste water treatment. In addition, reducing effluent contamination allows substantial recycling of treated effluent streams back to the mill.

Pulping and bleaching processes require large volumes of chemicals to produce bleached pulp suitable for producing paper. Because of this, both pulping and bleaching processes generate contaminated effluent requiring extensive treatment prior to discharge to the environment.

In the Kraft pulping process, currently the most prevalent process in the industry, sodium sulfide and sodium hydroxide (caustic soda) digest wood chips to form unbleached pulp. Effluent streams are created both in the preparation of the wood chips and in the recovery of spent liquor from the digesting process.

In the bleaching process, chlorine-based compounds are used extensively, with effluent streams being formed from various washing stages in the process. While chlorine-based bleaching compounds are very effective in pulp bleaching, they have the added effect of contaminating the effluent streams with chlorinated organics detrimental to the environment.

This occurs when the chlorine-based compounds react with lignin and other organic substances during bleaching. The result is the formation of so-called absorbable organic halogens (AOX) which accumulate in bleach plant effluent streams. Certain AOX have known carcinogenic effects in humans, and their level in the effluent streams is severely restricted.

Some organic contaminants also result in coloration of the effluent streams which has heretofore precluded substantial recycle of the effluent to the pulp mill, even after subsequent treatment.

AOX and other bleaching by-products, as well as any unreacted bleaching compounds, are removed from the bleached pulp by washing with water at various processing stages. The resulting effluent streams are then treated prior to discharge. Generally, these effluent streams are subjected to a waste water treatment process, and then discharged directly to the environment in large volume. Prior to discharge, the effluent streams are rigorously monitored for their biological oxygen demand (BOD) and chemical oxygen demand (COD), as well as for total organic carbon (TOC), effluent color, and toxicity, including AOX levels.

The primary means of reducing BOD, COD, TOC, color, AOX and toxicity in pulp mill effluent is through biological treatment. This normally requires large volume, aerated treatment lagoons with relatively long residence times to enable environmentally safe treated effluent discharge. As mills continue to expand pulp production capacities, their existing biological treatment steps are often unable to handle the corresponding increase in waste water influent and are unable to meet lower discharge levels.

For this reason, some mills have begun to employ chemical oxidants to enhance the contaminant removal capability of their existing waste water treatment lagoons. Chemical oxidants such as hydrogen peroxide, potassium permanganate, and ozone have been considered for this purpose. Chemical oxidants can be added directly to waste water influent, for example, to reduce its toxicity toward the resident microbial 10 population, or to reduce the contaminant burden prior to biological treatment. Alternatively, the oxidants can be added to effluent from biological treatment as a means of polishing the effluent, further reducing contaminants prior to discharge.

The use of these various chemical oxidants, while helpful in effluent treatment, are limited in their oxidation effect. Hence, chemical oxidants alone are insufficient for allowing anything but modest increases in pulp production capacity and/or for decreasing contaminant concentration in effluent discharge.

Another method for reducing the level of discharged contaminants in pulp mill effluent would be to recycle all or part of the effluent streams after treatment. Heretofore, this has not been considered a viable option, since no method has been available to reduce color and other contaminants to a low enough level. The chemical oxidants noted above are incapable of reducing contaminants to the required low levels. Also, the art did not think it possible that other chemical oxidants were capable of reducing contaminant concentration any further.

This conclusion stems from the nature of the unique contaminants in pulp mill effluent, making them very resistant to most chemical oxidants. Recycled effluent must have very low levels of color and other contaminants, otherwise the recycling would result in the production of off-specification pulp due to transfer of the color and other contaminants to the pulp, for example, during washing stages. Also, recycling the contaminant burden to the pulping and bleaching processes without increasing the amount of fresh water make-up, would cause an increase in the concentration of contaminants carried through the processes.

It has been known to combine the use of hydrogen peroxide with ultraviolet radiation in the treatment of sewage from naval vessels, as disclosed in U.S. Pat. No. 4,012,321, which patent is hereby incorporated by reference in its entirety. This patent teaches that irradiation of an aqueous waste stream (i.e., sewage) in which hydrogen peroxide has been added, facilitates the breakdown of the hydrogen peroxide to hydroxyl radicals (•OH).

U.S. Pat. No. 4,012,321 is particularly directed to the removal of acetic acid from sewage formed from human excrement. There is no indication in this patent that combined $UV/H_2O_2$ treatment would be useful in the treatment of the contaminants in pulp mill effluent.

Other documents pertaining to the combined use of $UV/H_2O_2$ include:

"The Oxidation Pre-Treatment of Organic Matter in Natural Waters", Tittle et al, Ion Exchange Technology, 1984, pp. 74–84; "Photoinduced Oxidation of Humic Acid in Water Using Hydrogen Peroxide and UV Irradiation", Morayama et al, Water Pollut. Dept. Nat'l. Res. Inst. Pollut. Resorv., Japan, Kogai 1985 20(i), 9–15; JP 62176595; DE 3501528; JP 60028883; JP 52035445; and JP 52016865. None of these documents, however, relates to the treatment of pulp mill effluent.

The use of various catalysts in the treatment of waste water is described in U.S. Pat. Nos. 5,043,080 and 5,266,214, both of which are incorporated herein by reference.

U.S. Pat. No. 5,043,080 relates to the treatment of liquid effluent or ground water with hydrogen peroxide and transition metal ions in the presence of UV radiation. There is no discussion of treatment of pulp mill effluent in this patent.

U.S. Pat. No. 5,266,214 relates to treatment of contaminated water with hydrogen peroxide and ferric oxalate in the presence of light, e.g., UV light. Again, this patent contains no teaching of the treatment of pulp mill effluent.

SUMMARY OF THE INVENTION

It is accordingly an object of the invention to provide a process for treating waste water effluent and particularly pulp mill effluent to significantly reduce the contaminant level thereof.

It is another object of the invention to provide a process, as above, which allows significant increases in pulp mill production capacity without additional investment in waste water treatment facilities.

It is still another object of the invention to provide a process, as above, which reduces contamination in pulp mill effluent, particularly color, AOX, TOC, COD and BOD, to a level sufficient to allow recycling of effluent, thereby enhancing the mill's ability to achieve a near zero effluent discharge and a more closed mill configuration.

These objects and others described below are achieved by a method for decreasing the contaminant burden in pulp mill effluent, which comprises the steps of (a) providing a pulp mill effluent containing organic contaminants; (b) determining the amount of organic contaminants in the effluent by measuring at least one of chemical oxygen demand, total organic carbon, color, absorbable organic halogens or biological oxygen demand; (c) adding hydrogen peroxide to the effluent in an amount sufficient to reduce the amount of organic contaminants to a predetermined level; (d) irradiating the effluent from step (c) with sufficient ultraviolet radiation to promote the formation of hydroxyl radicals from the added hydrogen peroxide; and (e) oxidizing a sufficient portion of the organic contaminants with the hydroxyl radicals formed in step (d) to reduce the level of the contaminants to the predetermined level.

The objects of the invention are also achieved by a 10 method, as above, in which at least a portion of the effluent from step (e) is recycled to the pulp mill.

The objects of the invention are further achieved by a method for reducing the contaminant burden in waste water effluent which includes treatment with hydrogen peroxide and UV light in the presence of a peroxidase catalyst.

BRIEF DESCRIPTION OF THE DRAWING

For a fuller understanding of the invention, reference should be made to the following detailed description and the drawings, wherein.

DETAILED DESCRIPTION OF THE PREFERRED EMBODIMENTS

Figure 1:
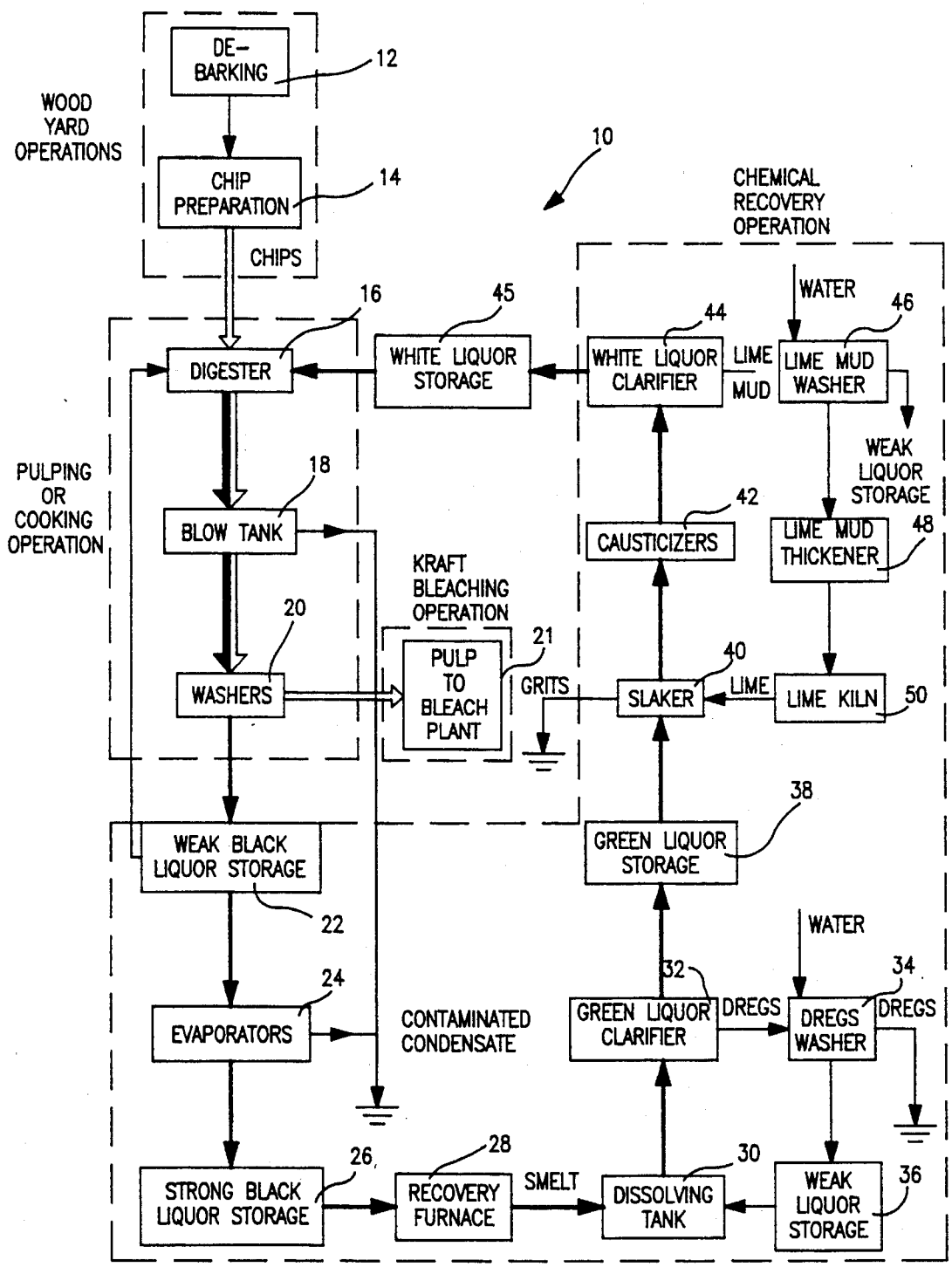
FIG. 1 is a schematic diagram of a Kraft pulping process.

A process for producing bleached pulp via the Kraft process is shown in FIG. 1 and is generally indicated by the number 10. Logs, either hardwood or softwood, are slashed and debarked in a debarking operation 12 and then reduced to small chips in a chipper 14. After screening to remove oversized chips and sawdust, the chips are charged to a digestor 16 containing sodium sulfide and sodium hydroxide (caustic soda). The pulp is then cooked with live steam at high pressure. After cooking, the charge, called "brown stock", is blown into either a blow tank 18 or a heat recovery furnace (not shown) to recover heat values from the steam. The digested pulp is washed in washers 20 to remove the spent cooking liquor which includes not only sodium sulfide and caustic soda, but also various organic and inorganic compounds and metal ions. Pulp from the washers is then bleached in bleach plant 21. The spent cooking liquor, or black liquor, is stored in vessel 22 to await concentration in evaporators 24. Black liquor from storage vessel 26 is fed to a recovery furnace 28 which burns the organic compounds, leaving a solid residue containing the inorganic materials and metals. The soluble components of this residue are separated from the insoluble components or "dregs" by dissolving the residue in water in a dissolving tank 30.

After removal in a clarifier 32, the dregs are washed in a dregs washer 34 to remove entrained liquor and the washings are recycled from storage 36 to the dissolved portion, called green liquor. Green liquor from storage 38 is slaked with lime in a slaker 40 and causticized with make-up caustic soda in causticizers 42 to form white liquor. The white liquor is clarified in a clarifier 44 to remove undissolved lime and impurities and then recycled from storage 45 back to the digestor. The solids from clarifier 44 are washed in a lime mud washer 46, thickened in a lime mud thickener 48 and then dried in a kiln 50. The dried lime is recycled to the slaker 40.

Effluent streams are created at various stages of the above process. For example, debarking and chip preparation, also collectively known as woodyard operations, require one or more washings to remove dirt and/or salt, the latter being the result of transporting cut logs in ocean water. Condensate from the evaporators and the blow tank contain various contaminants resulting in high COD levels. In the bleach plant 21, the bleaching steps include numerous washing stages, each of which results in a contained effluent stream.

Applicants have discovered that, quite unexpectedly, $H_2O_2$/UV treatment is highly effective in reducing the contaminant level of both pulping processes and bleaching operations. This result was unexpected because the conventional wisdom in the art has been that pulp mill effluents could not be treated in this manner. The use of UV to generate hydroxyl radicals has heretofore been limited to treating low concentrations of organic contaminants and hence has been thought best suited to treating relatively "clear and color free" effluent streams.

Applicants have additionally discovered that effluent treated in the manner described herein can be recycled to either a pulping process or bleaching operation, thereby further reducing the level of effluent discharge. The ability to recycle some or all of the effluent was also totally unexpected, and is due in part to the unexpectedly low levels of color and other contaminants observed in the treated effluent.

Recycled effluent replaces a corresponding amount of fresh water input. Generally, recycle can constitute at least 25% of the fresh water input, desirably at least 50% and preferably up to 100% replacement of fresh water input.

Specific examples of effluent streams and optional recycle to the pulping process or bleaching operation include the treatment of wash water from a bleaching operation and recycle to one or more washing stages. Wash water effluent is treated and monitored for COD and/or color removal, with the amount of hydrogen peroxide and/or UV light adjusted to maintain a predetermined COD level or color. All or a portion of the UV/$H_2O_2$ treated effluent can be recycled to the washing stage or stages.

In bleaching operations, the washing stages can be in parallel or in countercurrent series and treatment with UV/$H_2O_2$ can be carried out in a similar manner. Thus for parallel washing stages, the effluent from each parallel stage is collected and combined prior to treatment. If recycled, the treated combined stream is split and a portion thereof separately recycled to each washing stage. For countercurrent washing stages, the effluent from the final stage is treated and all or a portion of the treated effluent is recycled to the first washing stage.

In both parallel and countercurrent series washing, the amount of fresh wash water added is reduced in proportion to the amount of recycled effluent.

Bleaching operation effluent can also be recycled to the pulp process. For example, UV/$H_2O_2$ treated effluent can be combined with a reduced amount of fresh wash water and employed in woodyard operations, e.g., log flotation/conveying, wet debarking and log or chip washing. Treated bleaching plant effluent can also be employed in the washing of digested pulp, for example, in washers 20 of FIG. 1.

Figure 2:
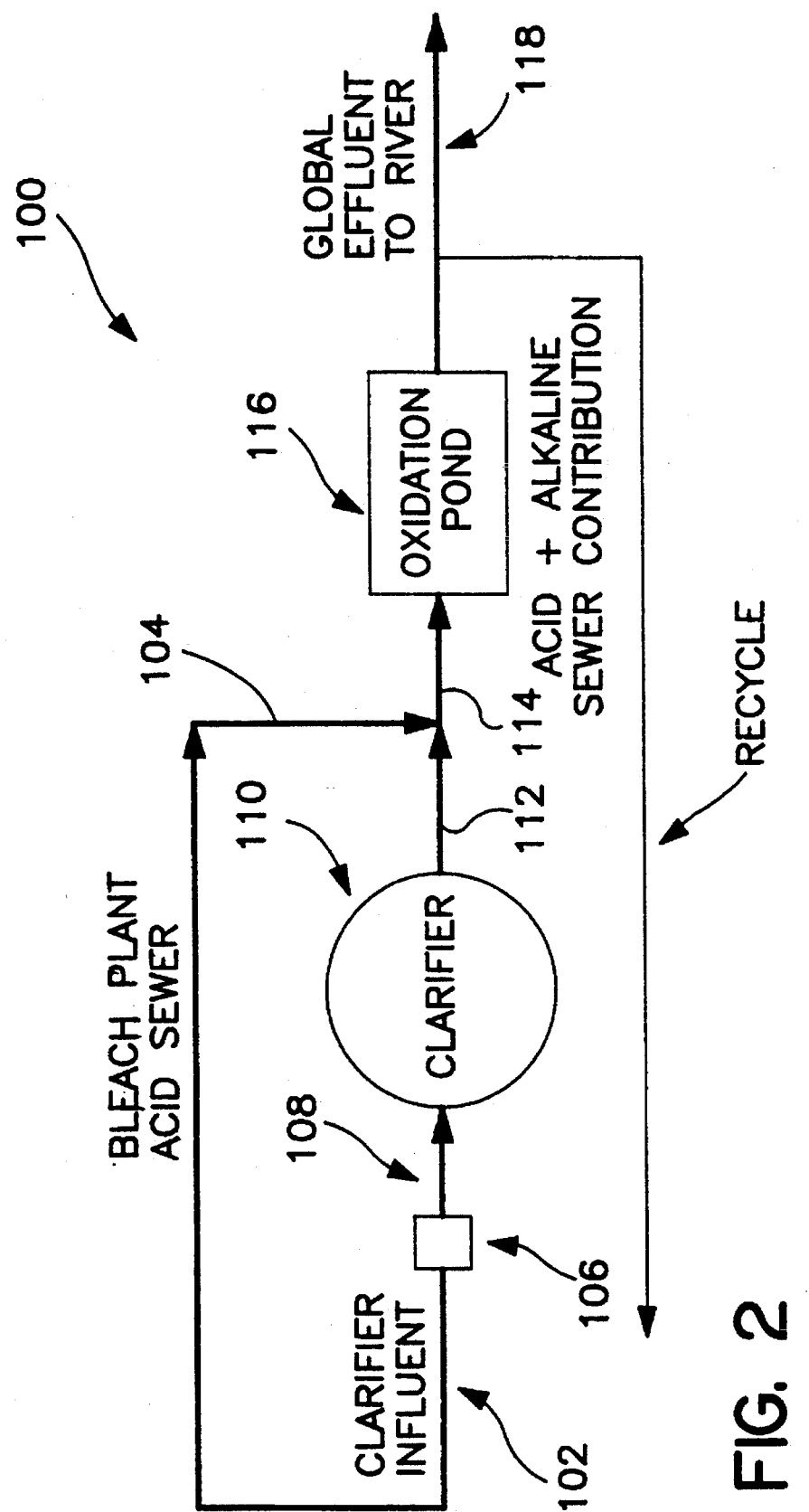
FIG. 2 is a schematic diagram of an effluent treatment in a pulp mill incorporating one embodiment of the invention.

Global mill effluent is another source of recyclable effluent. Global mill effluent is defined as the combined total effluent from the pulping process and bleaching operation. With reference to FIG. 2, the treatment scheme for global mill effluent is indicated generally by the number 100. Effluent stream 102 from a mill comprises the combined effluents of the pulping process and bleaching operation, with the exception of bleach plant acid stream 104. Effluent stream 102 is first treated with UV/$H_2O_2$ at 106. Treated stream 108 is then fed to a clarifier 110 to separate insoluble materials. Clarified stream 112 is combined with bleach plant acid stream 104 and the combined stream 114 is fed to an oxidation pond 116 for final treatment of BOD and COD. Global mill effluent stream 118 from oxidation pond 116 is then discharged to the environment. The amount of UV/$H_2O_2$ treatment, i.e., the intensity and duration of the UV radiation and the amount of $H_2O_2$ added, are preferably controlled as a function of COD in the effluent stream 102.

Some or all of the global mill effluent stream 118 can be recycled to the mill to partially replace fresh water input. Examples of such recycle include recycling to the bleaching operation. Preferably the treated global mill effluent is recycled to one or more washing stages in the bleaching cycle. Parallel or countercurrent series recycle, as described above in connection with recycling treated wash effluent, can be used.

Another example of global mill effluent recycle is recycling to a paper mill operation. In this application, the recycled effluent is used to reduce the consistency of the bleached pulp forming the paper.

Treated global mill effluent can also be used for washing the dregs from a green liquor clarifier. In this application, recycled effluent replaces all or a portion of the fresh water input to a dregs washer. In similar fashion, treated global mill effluent can be used in washing lime mud by replacing all or a part of the fresh water input to the lime mud washer.

Yet another application for global mill effluent is recycle to a smelt dissolving tank (for example, dissolving tank 30 of FIG. 1). Again, the recycled effluent can replace all or a portion of the fresh water input to the dissolving tank.

The above specific applications are mere examples of recycle schemes. Additional uses for recycled effluent are also contemplated. For example, it is possible to recycle effluent from the pulping process or the bleaching operation in the same manner as described above for global mill effluent. Likewise, recycled global mill effluent can be used in any of the above described applications for pulping process and bleaching operation effluent.

In general the amount of hydrogen peroxide added is based on the color, AOX, COD or TOC of the effluent. From 100% to 600% of the stoichiometric amount of $H_2O_2$ is used, based on the amount of the measured contaminant to be removed, desirably 100 to 300% and preferably from 100% to 125%. Generally, the amount of contaminant to be removed is at least 25% of the total, desirably at least 50% and preferably up to 100%.

Since pulp mill effluent contains a variety of contaminants, it is oftentimes difficult to precisely calculate the stoichiometric amount of hydrogen peroxide needed for treatment. Under these conditions, oxidant dosage in molar units can be estimated by the equation $$\left( \frac{MW}{16n} \right) COD,$$

where MW is the molecular weight of the oxidant (in this case 34 for $H_2O_2$) and n is the number of free reactive oxygens available per mole of oxidant (in this case 1.0 for $H_2O_2$). Hence, the oxidant dosage is estimated by the equation $$\left( \frac{34}{16} \right) COD \text{ or } 2.125 \, COD.$$

Generally, COD in an effluent stream can be reduced to below 1000, desirably below 200 and preferably below 50 by treatment with the process of the invention, AOX can be reduced to below 10,000 ppb (parts per billion), desirably below 2000 ppb and preferably below 1000 ppb.

Color, as measured by EPA 111.2, can be reduced to below 500, desirably below 100, preferably below 50 and most preferably below 20. TOC can be reduced to below 100 ppm, desirably below 25 ppm and preferably below 5 ppm.

The amount of UV radiation varies with the amount of hydrogen peroxide added. Generally the amount of UV radiation required is that necessary to break down sufficient $H_2O_2$ molecules to hydroxyl radicals for satisfying the predetermined reduction in contaminant level. UV dosage is measured in units such as kilowatt hours (KW-hr), watt minutes (W-min), etc. A preferred intensity level is 13 watts. At this intensity, the exposure time generally varies from about 10 to about 400 minutes (130 to 5200 W-min), desirably from about 20 to about 200 minutes (260 to 2600

W-min), preferably from about 20 to about 120 minutes (260 to 1560 W-min), and most preferably from about 20 to about 60 minutes (260 to 780 W-min).

While the above discussion is directed to treatment of effluent from a pulp mill, it is to be understood that the invention can also be used in sewage treatment, ground water treatment, etc.

In a preferred embodiment, a catalyst is added to the effluent in conjunction with hydrogen peroxide. Catalysts can, in certain instances, enhance the chemical oxidation effect of hydrogen peroxide by promoting the formation of highly reactive radical species, i.e., hydroxyl radical (·OH), or other organic radicals (·RH) which can enhance reaction kinetics, and result in a more complete chemical oxidation of chemical compounds.

Suitable catalysts include titanium dioxide, ferrous (II) iron compounds such as $FeCl_2$, $FeSO_4$, $FeO$, $Fe(OH)_2$, $FeSO_4 \cdot 7H_2O$, $FeI_2$, $Fe(C_2H_3O_2)_2$, iron (III) oxalate, and peroxidase enzyme.

In the case of titanium dioxide catalyst, band gap irradiation promotes an electron from the valence band to the conduction band, generating an electron deficiency or "positive hole" in the valence band. The photo-generated "holes" and electrons can then react with surface adsorbed species, and provide an alternative means of producing hydroxyl radicals. Photocatalytic applications of $TiO_2$ include its use as a powdered material in a solid/liquid slurry, or as a fixed heterogeneous catalytic surface.

Catalysis with ferrous (II) ions occurs via Fenton's reaction, wherein ferrous ions react with hydrogen peroxide to produce hydroxyl radicals and hydroxide ions. The ferrous (II) iron is added in an amount which maximizes the catalytic oxidative effect, and to favor the absorption of UV light by the hydrogen peroxide. Generally, the amount added is between about 5 and about 50 mg/L, and the reaction pH is typically maintained between 3 and 5.

Iron (III) oxalate absorbs light strongly between 200 and 500 nm wavelength. Photolysis of the oxalate generates ferrous (II) iron which then undergoes a Fenton's reaction with hydrogen peroxide to yield hydroxyl radicals. Since the photocatalyst absorbs light much more strongly and over a broader wavelength range than peroxide alone, such a catalyst can be useful when applied to highly contaminated effluent streams.

Peroxidase enzyme has been found useful in promoting the chemical oxidative effect of low to moderate concentrations of hydrogen peroxide. The enzyme catalyzes the transfer of electrons from electron donors to electron acceptors via the classic peroxidate reaction cycle:

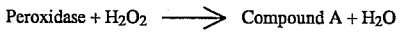
Peroxidase + $H_2O_2$ ⟶ Compound A + $H_2O$

Compound A + $RH_2$ ⟶ Compound B + ·RH

Compound B + $RH_2$ ⟶ Peroxidase + ·RH + $H_2O$

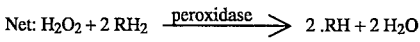
Net: $H_2O_2$ + 2 $RH_2$ $\xrightarrow{peroxidase}$ 2 ·RH + 2 $H_2O$

The enzyme can be used for oxidation of a broad range of aromatic compounds as well as other electron-rich donor compounds. Peroxidase exhibits optimal catalytic activity in a neutral to slightly alkaline pH range, with acceptable stability up to a maximum pH of about 10.5. Good catalytic activity is obtained at temperatures from normal ambient temperature to as high as 50° C. (122° F.) and hydrogen peroxide concentrations at or below about 1000 mg/L.

The amount of peroxidase used can vary from about 25 to about 600 mg/L, desirably from about 50 to about 200 mg/L and preferably from about 75 to about 100 mg/L of effluent to be treated.

The following examples, while not limiting the scope thereof in any way, serve to illustrate the invention:

EXAMPLE 1

Influent to a pulp mill clarifier was subjected to an $H_2O_2$/UV treatment as follows:

(I) Source: Clarifier influent, upstream of oxidative biotreatment pond.
  Content: Mixed mill effluent, excluding contributions from the bleach plant acid sewer.
  Flow: 18,472 GPM=26.6 MM gal per day (MGD)
Initial Contaminant Concentrations:

| | |
|---|---|
| (a) AOX = | 13,600 ppb (μg/L) |
| (b) TOC = | 150 ppm (mg/L) |
| (c) COD = | 1,400 ppm (mg/L); ref. Clayton Analytical Labs |
| COD = | 1,165 ppm (mg/L); ref. Eka Nobel Labs |
| (d) Color = | 900 Color Units; ref. Color Method EPA 111.2 |

(II) UV/$H_2O_2$ Treatment Using Stoichiometric+ 25% $H_2O_2$ Dosage:

| | |
|---|---|
| Treatment sample = | 2000 Ml "raw" clarifier influent |
| Oxidant Dosage = | 20 mL of 35% $H_2O_2$ solution in 2000 mL sample |
| UV Dosage = | 13 Watts/2000 mL sample and 2 hour exposure time |

Contaminant Reduction Results:

| Contaminant | Initial | Final | Removal % |
|---|---|---|---|
| AOX | 13,600 ppb | 1,980 ppb | 85% |
| TOC | 150 ppm | 10 ppm | 93% |
| COLOR | 900 C.U. | 55 C.U. | 94% |

(II) UV/$H_2O_2$ Treatment Using Stoichiometric+500% $H_2O_2$ Dosage:

| | |
|---|---|
| Treatment sample = | re-treatment of the case II sample |
| Oxidant Dosage = | 60 ml of 35% $H_2O_2$ added for a total of 80 ml |
| UV Dosage = | 13 watts/2000 ml Sample and retreated for a two hour exposure time |

Contaminant Reduction Results:

| Contaminant | Initial | Final | Removal % |
|---|---|---|---|
| AOX | 13,600 ppb | 1,230 ppb | 91% |
| TOC | 150 ppm | 2 ppm | 99% |
| COLOR | 900 C.U. | 25 C.U. | 97% |

What is claimed is:

1. A method for decreasing the contaminant burden in pulp and paper mill effluent comprising the steps of:

(a) providing a waste water effluent containing a first level of organic contaminants;

(b) determining the amount of organic contaminants in said effluent by measuring at least one of chemical oxygen demand, total organic carbon, color, absorbable organic halogens, or biological oxygen demand;

(c) adding hydrogen peroxide to the effluent in an amount sufficient to reduce the amount of organic contaminants to a second level lower than said first level;

(d) adding peroxidase enzyme to the effluent in a catalytically effective amount for increasing the activity of said hydrogen peroxide;

(e) irradiating the effluent from step (d) with at least about 780 watt minutes of ultraviolet radiation to promote the formation of hydroxyl radicals from the added hydrogen peroxide;

(f) oxidizing a sufficient portion of the organic contaminants with the hydroxyl radicals formed in steps (d) and (e) to reduce the level of said contaminants to said second level.

2. A method as claimed in claim 1 wherein the amount of said peroxidase is from about 25 to about 600 mg/L of effluent to be treated.

3. A method as claimed in claim 1 wherein the method further includes the step of (g) recycling at least a portion of the effluent from step (f) to the pulp mill.

4. A method as claimed in claim 3 wherein the method decreases the contaminant burden in a pulp mill bleaching plant having at least one pulp washing stage and at least one pulp washing stage effluent comprising said effluent of step (a), and wherein said recycle step (g) includes recycling at least a portion of a pulp washing stage effluent.

5. A method as claimed in claim 4 wherein said pulp mill bleaching plant has at least two pulp washing stages and the effluent in step (a) comprises effluent from each said washing stage, and wherein said recycle step (g) includes recycling at least a portion of said effluent from step (f) through each of said at least two washing stages.

6. A method as claimed in claim 4 wherein said pulp mill bleaching plant has at least two washing stages in counter current series, wherein an effluent from a last said washing stage comprises said effluent of step (a), and wherein said recycle step (g) includes recycling at least a portion of said effluent to a first washing stage.

7. A method as claimed in claim 4 wherein chemical oxygen demand is measured in step (b).

8. A method as claimed in claim 4 wherein color is measured in step (b).

9. A method as claimed in claim 3 wherein the effluent of step (a) comprises effluent from a bleach plant operation, and wherein said recycle step (g) includes recycling a portion of the effluent from step (f) to a wood yard operation.

10. A method as claimed in claim 9 wherein the measured organic contaminant comprises chemical oxygen demand.

11. A method as claimed in claim 3 wherein the effluent of step (a) comprises effluent from a bleach plant operation, and wherein said recycle step (g) includes recycling a portion of the effluent from step (f) to a washing stage in a pulping operation.

12. A method as claimed in claim 11 wherein the measured organic contaminant comprises chemical oxygen demand.

13. A method as claimed in claim 3 wherein the effluent of step (a) comprises global mill effluent, and wherein said recycle step (g) includes recycling a portion of the effluent from step (f) to a brown stock feed to a bleach plant.

14. A method as claimed in claim 13 wherein the measured organic contaminant comprises chemical oxygen demand.

15. A method as claimed in claim 3 wherein the effluent of step (a) comprises global mill effluent, and wherein said recycle step (g) includes recycling a portion of the effluent from step (f) to a bleached pulp feed to a paper mill.

16. A method as claimed in claim 15 wherein the measured organic contaminant comprises chemical oxygen demand.

17. A method as claimed in claim 3 wherein the effluent of step (a) comprises global mill effluent, and wherein said recycle step (g) includes recycling a portion of the effluent to a dregs washing step.

18. A method as claimed in claim 17 wherein the measured organic contaminant comprises chemical oxygen demand.

19. A method as claimed in claim 3 wherein the effluent of step (a) comprises global mill effluent, and wherein said recycle step (g) includes recycling the portion of the effluent to a lime mud washing step.

20. A method as claimed in claim 19 wherein the measured organic contaminant comprises chemical oxygen demand.

21. A method as claimed in claim 3 wherein the effluent of (a) comprises global mill effluent, and wherein said recycle step (g) includes recycling a portion of the effluent to a smelt dissolving tank.

22. A method as claimed in claim 21 wherein the measured organic contaminant comprises chemical oxygen demand.

\* \* \* \* \*